United States Patent [19]
Niehaus

[11] Patent Number: 5,706,938
[45] Date of Patent: Jan. 13, 1998

[54] DEVICE FOR RECEIVING DISK-LIKE OBJECTS

[75] Inventor: Ralf Niehaus, Bielefeld, Germany

[73] Assignee: HAN-Bürogeräte GmbH & Co. KG, Herford, Germany

[21] Appl. No.: 589,253

[22] Filed: Jan. 23, 1996

[30] Foreign Application Priority Data

Sep. 22, 1995 [DE] Germany .................. 295 15 193 U

[51] Int. Cl.⁶ .................................................. B65D 85/30
[52] U.S. Cl. ...................... 206/308.1; 206/310; 206/425; 40/383
[58] Field of Search .................... 206/425, 308.1, 206/309, 310, 312, 313, 232; 40/371, 372, 377, 383, 508

[56] References Cited

U.S. PATENT DOCUMENTS

| | | | |
|---|---|---|---|
| 2,297,442 | 9/1942 | Volk | 40/383 |
| 4,242,819 | 1/1981 | Swift et al. | 40/372 |
| 4,702,369 | 10/1987 | Philosophe | 206/309 |
| 5,176,250 | 1/1993 | Cheng . | |
| 5,370,224 | 12/1994 | Karakane et al. . | |
| 5,433,319 | 7/1995 | Tang | 206/308.1 |
| 5,462,158 | 10/1995 | Kramer | 206/308.1 |

FOREIGN PATENT DOCUMENTS

| | | | |
|---|---|---|---|
| 2 602 084 | 1/1988 | France | 206/309 |
| 2 706 671 | 12/1994 | France . | |
| 41 18769 | 12/1992 | Germany . | |
| G 94 04 298.5 | 7/1994 | Germany . | |
| 295 00 251 U | 2/1995 | Germany . | |
| G 94 15 393.0 | 2/1995 | Germany . | |

Primary Examiner—Jimmy G. Foster
Assistant Examiner—Nhan T. Lam
Attorney, Agent, or Firm—Shlesinger, Arkwright & Garvey LLP

[57] ABSTRACT

Device for removably receiving a planar object, in particular a compact disk (CD), fitted with a central round receiving aperture. The device may be a plate comprising a recess to receive such planar object and a central clamp for the round receiving aperture of such planar object. The receiving plate comprises at least on one side, and in the vicinity of its edge, two mutually spaced boreholes for "threading" or stacking, for instance when using bar-shaped retainers or ring-binders. The boreholes each communicate through a slot of lesser width than the borehole diameters with the side edge of the receiving plate. Incisions are formed on and near both sides of the slots to form resilient wall portions bounding the slots.

10 Claims, 1 Drawing Sheet

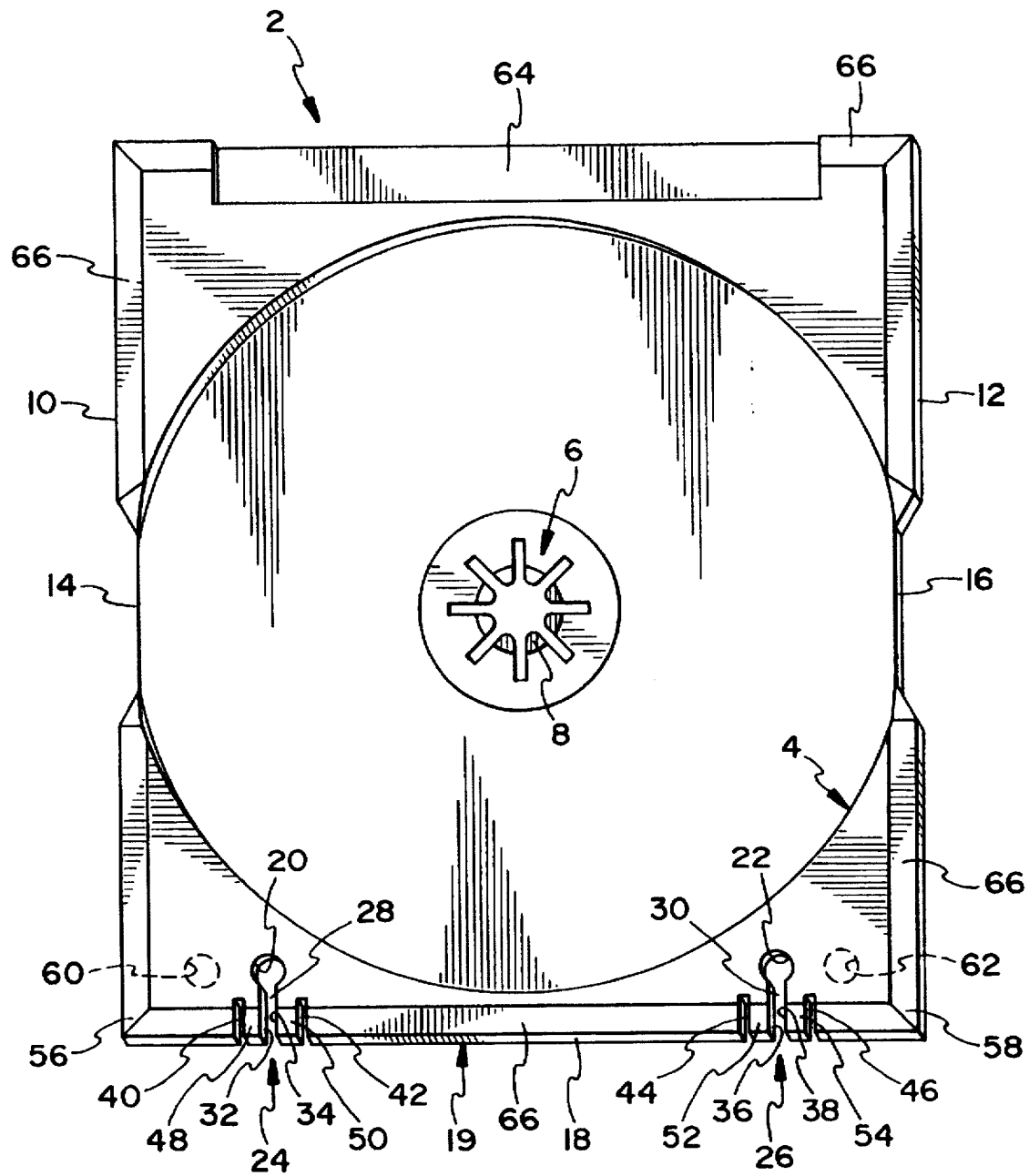

DEVICE FOR RECEIVING DISK-LIKE OBJECTS

FIELD OF THE INVENTION

The invention concerns devices for receiving planar objects, in particular compact disks (CDs).

BACKGROUND OF THE INVENTION

CDs typically are stored in flat flap-sealed receptacles comprising an inset with a central receiving drawer fitted with a central clamp for a central, circular aperture in the CD. Among other means, adjusting ledges are used to store and handle the flap-receptacles which can tip therein by a slight angle, allowing "flipping" the receptacles for instance when searching. This known type of storage and handling of CDs is laborious and bulky.

OBJECTS AND SUMMARY OF THE INVENTION

Accordingly the object of the present invention are devices receiving planar objects, in particular CDs, allowing simpler, more compact storage and archiving as well as easier handling of said objects.

This problem is solved by the invention.

Advantageous and appropriate further developments of the invention are stated in the sub-claims.

The design of the invention allows sorting and archiving a large number of planar objects such as CDs in the most compact possible space, for instance using lever-driven office ring-binders, file covers and envelopes etc. or using bar-shaped retention means.

The advantageous and appropriate further developments of the invention such as boreholes having slots less than the diameters of the boreholes, and incisions defining resilient wall portions make it possible to stack the device of the invention for instance on two parallel bars, to displace it along them and to remove it again in problem-free manner from these bars. Moreover this design allows "flipping" the devices of the invention.

The third and fourth boreholes of the invention disposed in at least one corner of the plate allow mounting the devices of the invention on one rod only, whereby the search-and-sort procedure can be carried out by a merely pivoting motion of the plate perpendicular to the receiving rod.

Such search procedures are facilitated by providing a labeling area on the side of the plate opposite the boreholes.

Bevels on the edge of the receiving plate facilitate the flipping of the devices of the invention even when they are arranged against one another as tightly as possible, for instance in a drawer.

BRIEF DESCRIPTION OF THE DRAWING

The FIGURE is a plan view of a preferred embodiment according to the invention.

DETAILED DESCRIPTION OF THE PREFERRED EMBODIMENTS

The drawing is a top view of a device receiving planar objects, in particular CDs. The device comprises a substantially rectangular, especially square and thin plate 2, for instance made of plastic, evincing a central, circular recess 4 as the receiving compartment for instance for an omitted CD. A clamp 6 is present at the center of the recess 4 and comprises resilient circularly arrayed teeth 8 pointing radially inward and angled at a Z out of the recess 4, said teeth geometrically locking the conventional central circular clearance of a plate 2 which they secure against falling out.

Two diametrically opposite clearances 14, 16 are present at two opposite sides 10, 12 of the plate 2 to allow easily seizing a CD present in the recess 4.

Between the recess 4 and an edge 19, and at a side 18 mounted perpendicularly to the sides 10, 12, the plate 2 comprises boreholes 20, 22 near said edge 19. Both boreholes 20, 22 openly communicate through a slot 24, 26 with this edge 19. The width of the slots 24, 26 is less than the diameter of the boreholes 20, 22. On the side toward the edge 19, the slot walls comprise mutually facing projections 32, 34, 36, 38 slightly entering the slot space 28, 30.

Incisions 40, 42, 44, 46 are present on both sides of and near the slots 24, 26, thereby forming resilient wall portions 48, 50, 52, 54 bounding the slots. On account of their resiliency wall portions 48, 50, 52, 54 allow pressing affixation means such as bars or rods of larger diameters than the slot width into the boreholes 20, 22. The projections 32, 34, 36 and 38 enhance the retention of the plate 2 by an affixation means against undesired detachment.

By means of the boreholes 20, 22, or by means of the boreholes 20, 22 and the slots 24, 26, the plates 2 can be sorted compactly in fixtures such a office filing means, for instance lever-driven or other ring binders and the like with bar-shaped or rod-shaped affixation means.

Instead of or in addition to the boreholes 20, 22, third and fourth boreholes 60, 62 next to the boreholes 20, 22 may be formed at each corner 56, 58 for instance as rupture sites for the purpose for "threading" the plates 2 for instance on only one (omitted) affixation rod, whereby the CDs may be pivoted about such a rod.

A labeling area 64 is formed on the side opposite the boreholes 20, 22.

The plate 2 comprises peripheral bevels 66 allowing convenient of flipping the plates 2 even when they are tightly arranged against each other, for instance when being placed in a drawer or the like.

The above described device for receiving planar objects may be manufactured economically by plastic injection-molding.

I claim:

1. A device for removably receiving a planar object: having a central, round receiving aperture, said device comprising:
   a) a receiving portion, said receiving portion including a receiving plate having a recess configured for receiving a planar object;
   b) said recess including a central clamp for engaging the round receiving aperture of the planar object;
   c) said receiving plate including at least one side;
   d) said receiving plate including two spaced-apart boreholes, each said borehole being configured for mounting on a holder;
   e) said two boreholes being disposed substantially adjacent said at least one side of said receiving plate;
   f) each one of said boreholes communicating through a slot with an edge of said at least one side of said receiving plate;
   g) each said slot having a width less than the diameter of each said borehole;
   h) a plurality of incisions disposed on opposed sides of and near each said slot;

i) each one of said plurality of incisions defining a plurality of resilient wall portions bounding each said slot; and, j) a projection disposed on each one of said plurality of resilient wall portions and extending into each said slot.

2. A device as defined in claim 1, wherein:

a) at least one corner is provided on said receiving plate; and b) a third borehole is disposed substantially adjacent said at least one corner, said third borehole being configured for receiving and pivotably attaching a member.

3. A device as defined in claim 1, wherein:

a) said at least one side includes two mutually opposite sides; and b) a lateral clearance is provided on each of said opposite sides, each said clearance being configured for allowing a user to seize a planar object disposed in said recess.

4. A device as defined in claim 1, wherein:

a) said receiving plate includes a further side disposed opposite said boreholes; and b) a labelling area is provided on said further side.

5. A device as defined in claim 1, wherein:

a) said at least one side is bevelled.

6. A device for removably receiving a planar object having a central aperture, said device comprising:

a) a receiving member, said receiving member including a recess configured for receiving a planar object;

b) said recess including a central clamp for engaging the central aperture of a planar object;

c) said receiving member including at least one side;

d) said receiving member including two spaced-apart boreholes, each said borehole being configured for mounting on a holder;

e) said two boreholes being disposed substantially adjacent said at least one side of said receiving member;

f) a slot disposed between each one of said boreholes and an edge of said at least one side of said receiving member;

g) each said slot having a width less than the diameter of each said borehole, and each said slot communicating each borehole with said edge of said at least one side;

h) at least one incision disposed substantially adjacent each said slot;

i) said at least one incision defining a resilient wall portion bounding each said slot; and j) a projection disposed on each said resilient wall portion and extending into each said slot.

7. A device as defined in claim 6, wherein:

a) at least one corner is provided on said receiving member; and b) a third borehole is disposed substantially adjacent said corner, said third borehole being configured for receiving and pivotably attaching a member.

8. A device as defined in claim 6, wherein:

a) said at least one side includes two opposed sides; and b) a lateral clearance is provided on each of said opposed sides, each said clearance being configured for allowing a user to seize a planar object disposed in said recess.

9. A device as defined in claim 6, wherein:

a) said receiving member includes a further side; and b) a labelling area is provided on said further side.

10. A device as defined in claim 6, wherein:

a) said at least one side is bevelled.

* * * * *